Oct. 7, 1958     A. M. MOEN     2,854,999

MIXING FAUCET

Filed May 24, 1954

INVENTOR.
ALFRED M. MOEN
BY
Cook & Robinson
ATTORNEYS

United States Patent Office 2,854,999
Patented Oct. 7, 1958

2,854,999

MIXING FAUCET

Alfred M. Moen, Seattle, Wash.

Application May 24, 1954, Serial No. 431,860

9 Claims. (Cl. 137—625.17)

This invention relates to faucets and more particularly to what are designated as "mixing faucets," as designed for controlling the volume of flow of a mixture of hot and cold water and for varying the proportionate amounts of hot and cold water admitted to the mixing chamber of the faucet.

The principal objects of the present invention are: To provide an improved form of mixing and control valve; to provide separate and independently operable knob controls for determining and varying the mixture and its volume of flow from the faucet; and to provide novel and practical means for connecting hot and cold water supply lines with the valve.

Still further objects and advantages of the present invention reside in the details of construction and combination of parts comprised therein, and particularly in the provision of a rotatably adjustable and longitudinally movable sleeve for controlling both the mixture and volume of flow, and in the arrangement and relationship to each other, of the mixture and volume control knobs as operatively connected to the valve operating stem.

In accomplishing the above mentioned and other objects of the present invention, I have provided the improved details of construction, the preferred forms of which are illustrated in the accompanying drawings, wherein.

Figure 1:
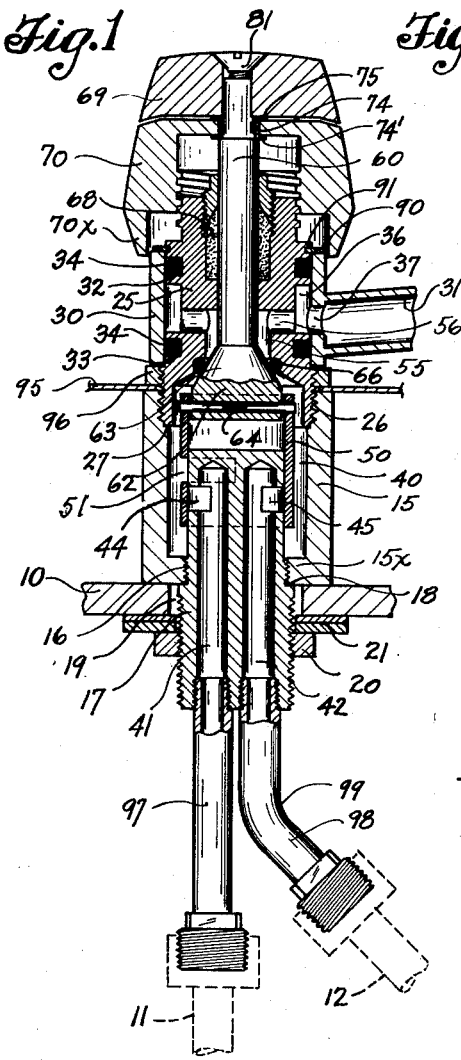
Fig. 1 is a cross-section taken in an axial plane of a faucet embodying the improvements of the present invention therein.
Figure 7:
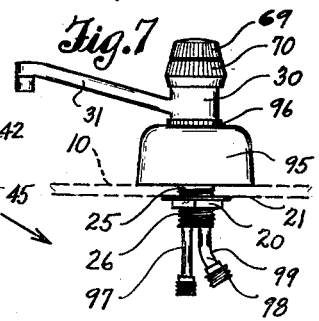
Fig. 7 is an elevation of the faucet.

Referring more in detail to the drawings:

The present faucet is designed for mounting on a sink ledge, or the like, such as that designated by numeral 10 in Figs. 1 and 7, and to be connected as in Fig. 1 with hot and cold water supply lines designated respectively, by the numerals 11 and 12.

The faucet comprises a cylindrical base housing 15 that is closed at its lower end by a wall 15x formed with a centrally located opening 16 into which a plug 17 is threaded; the plug being formed between its upper and lower ends with an upwardly facing annular shoulder 18 that is tightened against the under surface of the housing wall 15x to definitely establish its position relative to the housing.

The lower end of housing 15 rests flatly against the sink ledge 10, and the extending lower end portion of the plug 17 is exteriorly threaded and projects downwardly and through an opening 19 in the ledge, and has a securing nut 20 applied thereto. The nut is drawn tightly against a washer 21 that is applied about the threaded lower end portion of the plug between the under surface of the ledge 10 and the nut 20. Thus, the housing 15 is rigidly and securely held in position relative to the supporting shelf 10.

Threaded into the upper end of the housing 15 is a closure member which has various functions and which is herein referred to as a "plug," and is designated in its entirety by reference numeral 25. This plug serves as a mounting means for the presently described valve actuating stem 60; as a mounting means for the presently described swing spout 31 and also as a mounting for one of the valve adjusting knobs presently to be described.

Figure 2:
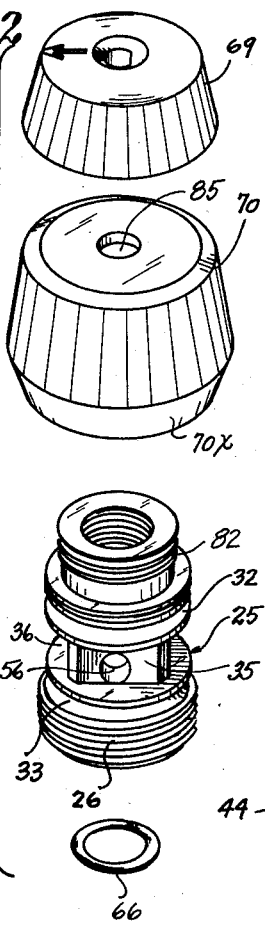
Fig. 2 is a perspective view of the plug in which the valve stem is mounted and the two knobs to be associated with the valve stem for valve adjustment.

As shown best in Fig. 2, the plug 25 has its lower end portion exteriorly threaded, as at 26, and this end portion is threaded into and seated within the upper end of the housing 15, against an annular shoulder 27. Immediately above its threaded lower end portion, the plug 25 is cylindrically formed. Rotatably fitted about this cylindrically formed portion of the plug is the cylindrical mounting end portion 30 of a water discharge spout 31. Formed in the upper and lower end surfaces of the cylindrical portion of the plug 25, are encircling channels 32 and 33 in which joint sealing gaskets 34—34' of O-ring form are contained to seal the joints against leakage, and between the channels 32 and 33 the body portion of the plug is diametrically reduced, to provide the squared shank portion 35 shown in Fig. 2, and the plug encircling channel 36 which has direct communication with the spout 31 through a wall opening 37 in the spout mounting portion 30.

The valve housing 15 provides therein a mixing chamber 40. Water is admitted to this chamber through passages 41 and 42 that are formed lengthwise of the plug 17, from its lower end to near its upper end, as has been shown best in Fig. 1. The upper end portion of the plug 17, as contained in housing 15, is of cylindrical form and is of lesser outside diameter than the inside diameter of housing 15 to provide the annular mixing chamber 40 thereabout. The two passages 41 and 42 extend in parallel relationship, and along opposite sides of the axial line of the plug and open into the mixing chamber 40 at their upper ends, respectively, through oppositely disposed arcuate slots 44 and 45. These slots are formed in the plug at the same horizontal level, and each extends through an arc of approximately 90° as will be noted by reference to their showing in Figs. 4, 5 and 6.

Figure 4:
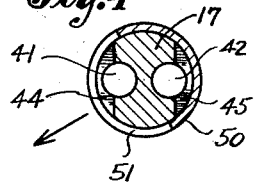
Figs. 4, 5 and 6 are cross-sectional views taken through the valve sleeve and its mounting member, and showing the valve as positioned, respectively, for flow of all hot water; for obtaining a mixture of equal amounts of hot and cold water, and for flow of all cold water.
Figure 5:
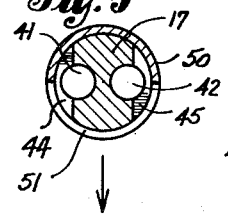
Figure 6:
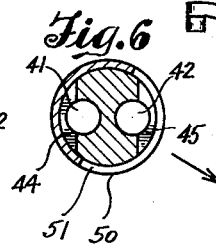

Rotatably fitted about the upper end portion of plug 17, and also longitudinally adjustable thereon, is the valve sleeve 50 whereby the proportionate amounts of cold and hot water admitted to the mixing chamber, and also the volume of the mixture, are controlled. This sleeve is cylindrical, and is open at both ends, and is provided intermediate its ends with a circumferentially directed slot 51 extending through an arc of 180°, as shown in Figs. 4, 5 and 6. By rotative adjustment of this sleeve on plug 17, the slot 51 can be selectively registered with either of the plug outflow passages 44 or 45 to obtain either all hot water, or all cold water, or caused to be brought into communication with each of them to more or less extent, to obtain a mixture ranging between limits of all one or all of the other. By longitudinal shifting of the sleeve 50, the volume of flow of hot or cold, or of a mixture can be regulated.

To provide for outflow of water from the mixing chamber 40, the plug 25 is formed in its lower end portion with an axial bore or passage 55 from the upper end of which radial passages 56 open into the annular passage 36 from which port 37 opens into the spout 31. At its lower end the passage 55 is diametrically flared to nearly the full diameter of the lower end portion of the plug as has been shown in Fig. 1.

The adjustments of the valve sleeve 50 are effected through the mediacy of a valve stem 60 which extends coaxially through the plug 25 as shown in Fig. 1 and from its upper end. At its lower end the stem passes, with a substantial amount of clearance, through the passage 55 and is then formed with an enlarged lower end head 62 having a conically formed and upwardly sloping upper end surface 63 merging into the stem. The lower end portion of this head 62 is loosely contained within the upper end portion of valve sleeve 50 and the two parts are joined by a horizontal pivot pin 64 that is projected diametrically therethrough as shown in Fig. 1. The conically tapered upper surface 63 of the head 62 provides a shoulder that is adapted to be seated against an O-ring gasket 66 that is applied within an annular channel formed in the plug about the lower end of passage 55 thus to close the mixing chamber outlet. This seating is effected by the upward adjustment of the stem 60 for moving the valve sleeve 50 to its closed position, as seen in Fig. 1, at which the valve sleeve slot 51 is located above and out of communication with either of the plug outlets 44 or 45.

The valve stem 60 extends from the upper end of plug 25, after passing through a packing gland 68. Its rotary and longitudinal adjustment is effected through the rotatable adjustment of knobs 69 and 70 that are applied thereto as will now be described.

Figure 3:
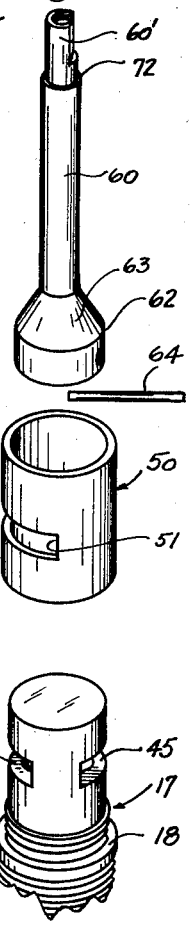
Fig. 3 is a perspective view of parts comprised in the valve structure, and the valve actuating stem; these parts being shown in a disassembled relationship.

The upper end portion of the stem, designated 60' in Fig. 3, is reduced in diameter, thus providing an upwardly facing annular seat 72. Rotatably fitted about the part of reduced diameter and against the seat is a collar 74 with outturned flange 74' at its lower end. A washer 75 is rested against its upper end. Applied to the upper end of the stem and seated against the washer 75, is the knob 69; this being keyed to the stem and then secured by a screw 81 that is passed therethrough and threaded into the stem.

The upper end portion of plug 25 extends above the spout mounting sleeve 30 as seen in Fig. 1, and it is somewhat reduced in diameter. This upper end portion is exteriorly threaded as at 82 in Fig. 2.

Threaded onto the upper end portion of plug 25 is the second knob 70. This is formed at its lower end with a skirt portion 70x that is adapted to move telescopically over and along the upper end portion of the cylindrical spout supporting member 30 with the turning of the knob. At its upper end the knob has a closing wall formed with an opening 85 containing the collar 74. This wall is held between the flange 74' of collar 74, and the washer 75 so that with the threading of the knob 70 onto or from the upper end portion of plug 25, to valve stem 60 will be shifted upwardly or downwardly to adjust the valve sleeve 50 accordingly as a means for regulating volume or rate of flow of water from the faucet.

The water mixture or the selection of hot or cold water is effected by the rotatably adjustment of the valve sleeve 50 when in an open position, and this rotation is effected by rotative adjustment of the knob 69.

It is shown in Fig. 1 that a flat snap ring 90 is applied within an encircling channel 91 in the medial portion of the plug 25, to retain the spout mounting element 30 against upward movement on the plug.

For ornamental and other purposes, it is desirable that the housing 15 be enclosed in a skirt 95, as shown in Fig. 7, this having a hole in its upper end wall through which the plug 25 is passed. A nut 96 applied to the threads 26 and tightened against the skirt keeps it in place and locked against the upper end of housing 15.

The water supply lines 11 and 12 are connected to the passages 41 and 42 through the mediacy of short lengths of tubing 97 and 98; the tube 98 being given an angular bend as at 99, in order to provide the necessary clearance for making the connections as will be understood by reference to Fig. 1. The bent or offset portion also makes this structure possible by permitting the passages to be in close parallel relationship. If one of the tubes were not bent it would be impossible to insert them into the passages.

Having thus described my invention, what I claim as new therein and desire to secure by Letters Patent is:

1. A faucet comprising a housing providing a mixing chamber with an outlet, a valve plug fixed to said housing in the lower end of said chamber and having hot and cold water supply passages leading thereinto with radial outlets opening therefrom, a cylindrical valve sleeve fitted about the plug in water tight relationship thereto and, across said outlets, said sleeve being rotatable and longitudinally adjustable along said plug, a manually operable means for effecting and controlling said adjustments of the sleeve; said sleeve having an opening in a wall thereof adapted, by rotary adjustment of the sleeve, to be selectively registered with the plug outlets or brought into communication with both of them to more or less extent to vary the proportionate amounts of hot and cold water admitted to the mixing chamber and by longitudinal adjustment to regulate the volume of flow into the chamber from said outlets.

2. A faucet comprising a housing providing a mixing chamber having an outlet at one end, a plug extending into said chamber through the other end of the housing and having hot and cold water supply passages leading thereinto with radial outlets opening therefrom at opposite sides of the plug, a sleeve fitted in the chamber about said plug in water tight relationship thereto and across said outlets said sleeve being rotatable and longitudinally adjustable in relationship to the plug to control mixture and flow, a stem operatively connected to said sleeve coaxially thereof and extended from the housing through said mixing chamber outlet, handle means on the outer end of the stem for effecting rotary and longitudinal adjustment of the sleeve, said sleeve having a circumferentially directed slot therein adapted, by rotary adjustment of the sleeve, to be selectively registered with the plug outlets or brought into communication with both of them to obtain a mixture of hot and cold water, and to be adjusted longitudinally of the plug to regulate the volume of flow from the outlets into said chamber.

3. A faucet as recited in claim 2 wherein the said stem extends in a loose fit into one end of the sleeve and a pivot pin extends diametrically through the stem and sleeve to effect an operative connection between them.

4. A faucet comprising a housing providing a mixing chamber having a central outlet, an outlet plug applied to the upper end of said housing in said central outlet, a valve plug applied to the lower end of the housing and extended into said mixing chamber coaxially of the said central outlet, hot and cold water supply passages extending through the plug from outside the housing with outlets opening into the mixing chamber at the sides of the plug, a sleeve fitted about said valve plug in water tight relationship thereto and across said outlets and adapted for rotative and longitudinal adjustment thereon, a stem fixed to the sleeve and extended therefrom through said outlet plug, means on the outer end of the stem for effecting rotative and longitudinal adjustments of said stem and sleeve; said sleeve having an opening therein adapted to be moved by rotary adjustment of the sleeve into communication with the said valve plug outlets to selectively control flow of hot and cold water therefrom in varying proportionate amounts, and to be adjusted by longitudinal shifting of the sleeve to regulate volume of flow.

5. A faucet as recited in claim 4 wherein the means at the outer end of the stem for making adjustments of the sleeve comprises a knob that is threaded onto the outlet plug and is formed with an axial opening through which said stem extends, means fixing the said stem and knob against relative longitudinal movement while permitting rotation of the stem and a second knob fixed to the stem at its outer end for rotation of the stem.

6. A faucet comprising a cylindrical housing providing a mixing chamber, an outlet plug threaded into the upper end thereof, and formed with an axial bore providing an outlet from the chamber and a valve seat formed in the plug about said outlet, a valve plug threaded into the lower end of the housing and extending therefrom as a mounting nipple, and extended into the mixing chamber, hot and cold water supply passages in the valve plug opening into the chamber through outlets in the sides of the plug, a valve sleeve rotatably and longitudinally shiftable on said valve plug across said outlets and having an opening therein that is rotatably adjustable for mixture control and longitudinally adjustable for volume control, a control stem fixed to the sleeve and extended through said axial bore of the outlet plug, a knob threaded onto the outer end of the outlet plug and having a holding connection with the stem for effecting its longitudinal adjustment with the turning of said knob, a second knob fixed to the stem for its rotation and rotatable adjustment of the sleeve, a swing spout mounted on the outlet plug, and having communication with the said axial bore thereof.

7. In a faucet of the character described, a valve housing enclosing a valve chamber having hot and cold water inlets and a fluid outlet passage, a valve member having axial rotatable movement about and longitudinally shiftable movement along a fixed axial line and constructed and arranged to coact with said inlets to control water flow and mixture, flow being controlled by one of said movements and mixture being controlled by the other movement, a plug secured to and projecting from said housing, a stem operatively connected to said valve member and extending from said housing through the plug, a stem rotating member secured to the outer end of the stem, a knob freely rotatable about the stem below the rotating member and held thereon by the rotating member, external threads on the upper end of said plug, said knob having internal threads providing a threaded mounting for the knob on said plug and the knob being adjustable along the threaded mounting in one direction for engagement with the rotating member to effect longitudinal movement of the stem and valve member in one direction and means on the stem engageable with the knob on rotation thereof in the opposite direction for effecting reverse longitudinal movement of the stem and the valve member.

8. A faucet comprising a housing providing a mixing chamber with an outlet, a valve plug fixed to said housing in the lower end of said chamber and having hot and cold water supply passages leading thereinto with radial outlets opening therefrom, said plug extending from the housing as a mounting nipple for the faucet, a cylindrical valve sleeve fitted about the plug in water tight relationship thereto and across said outlets, said sleeve being rotatable and longitudinally adjustable along said plug, a manually operable means for effecting and controlling said adjustments of the sleeve, said sleeve having an opening in a wall thereof adapted by rotary adjustment of the sleeve to be selectively registered with the plug outlets or brought into communication with both of them to more or less extent to vary the proportionate amounts of hot and cold water admitted to the mixing chamber and by longitudinal adjustment to regulate the volume of flow into the chamber from said outlets, a plurality of fluid supply pipe connectors removably secured in said passages to the outer end of said plug and at least one of said supply pipe connectors being angularly bent intermediate its ends away from the other supply pipe connectors to provide clearance between them to facilitate attachment to said plug and with the straight portions of said supply pipe connectors being parallel to each other and to the center line of the plug.

9. A faucet comprising a housing providing a mixing chamber with an outlet, a valve plug fixed to the lower part of said housing and having a plurality of fluid passages therein and outlets therefrom, said valve plug extending from said housing as a mounting nipple, a valve member having axial rotatable movement about and longitudinally shiftable movement along a fixed axial line and constructed and arranged to coact with said outlets to control water flow and mixture, flow being controlled by one of said movements and mixture being controlled by the other movement, a plug secured to and projecting from the upper part of said housing, a stem operatively connected to said valve member and extending from said housing through the plug, a stem rotating member secured to the outer end of the stem, a knob freely rotatable about the stem below the rotating member and held thereon by the rotating member, external threads on the upper end of said plug, said knob having internal threads providing a threaded mounting for the knob on said plug and the knob being adjustable along the threaded mounting in one direction for engagement with the rotating member to effect the longitudinal movement of the stem and valve member, means on the stem engageable with the knob on rotation thereof in the opposite direction for effecting reverse longitudinal movement of the stem and valve member, and a plurality of fluid supply pipe connectors removably secured in said passages to the outer end of said valve plug and at least one of said supply pipe connectors being angularly bent intermediate its ends away from the other supply pipe connectors to provide clearance between them to facilitate attachment to said valve plug and with the straight portions of said supply pipe connectors being parallel to each other and to the center line of the valve plug.

References Cited in the file of this patent

UNITED STATES PATENTS

| | | |
|---|---|---|
| 998,496 | Godleskie | July 18, 1911 |
| 1,181,662 | Hartmann | May 2, 1916 |
| 1,737,734 | Schlesinger | Dec. 3, 1929 |
| 2,332,995 | Eaton | Oct. 26, 1943 |
| 2,373,702 | Moen | Apr. 17, 1945 |
| 2,644,483 | Parker | July 7, 1953 |
| 2,695,156 | Ivanek | Nov. 23, 1954 |

FOREIGN PATENTS

| | | |
|---|---|---|
| 97 | Great Britain | of 1901 |